United States Patent [19]

Bounds, Jr.

[11] Patent Number: 5,247,903
[45] Date of Patent: Sep. 28, 1993

[54] EGG TRANSFER DEVICE

[76] Inventor: Edward G. Bounds, Jr., 1707 Timberlake Dr., Salisbury, Md. 21801

[21] Appl. No.: 870,430

[22] Filed: Apr. 15, 1992

Related U.S. Application Data

[63] Continuation-in-part of Ser. No. 756,560, Sep. 9, 1991, Pat. No. 5,107,794.

[51] Int. Cl.$^5$ ............................................. A01K 41/06
[52] U.S. Cl. ...................................... 119/44; 119/45.1
[58] Field of Search .................. 119/43, 44, 45.1, 45.3

[56] References Cited

U.S. PATENT DOCUMENTS

| | | | |
|---|---|---|---|
| 1,646,334 | 10/1927 | Wollenhaupt | 119/45.1 |
| 1,773,896 | 8/1930 | Jackson | 119/44 |
| 2,793,581 | 5/1957 | Cannon | 119/44 |
| 4,512,285 | 4/1985 | McGehee | 119/44 |
| 5,003,924 | 4/1991 | Dambre | 119/44 |
| 5,107,794 | 4/1992 | Bounds, Jr. | 119/44 |

FOREIGN PATENT DOCUMENTS

| | | | |
|---|---|---|---|
| 408632 | 7/1974 | U.S.S.R. | 119/43 |
| 862086 | 3/1961 | United Kingdom | 119/43 |

Primary Examiner—Paul J. Hirsch
Attorney, Agent, or Firm—Wenderoth, Lind & Ponack

[57] ABSTRACT

An egg transfer device having an active rotator assembly and a passive rotator assembly pivoted about a common axis above a support table. An automatic clamping device associated with the active rotator assembly is held in an unlocked or open position to allow the active rotator assembly to be loaded with egg flats. After a hatcher tray for receiving the eggs from the egg flats is disposed on top of the egg flats and the passive rotator is rotated thereover, the two rotator assemblies are rotated together about their common axis 180 degrees to their opposite position on the support table. At the same time the automatic clamping assembly is automatically moved into its locked position, thus firmly gripping the tray of egg flats securely into the active rotator assembly as it is being rotated, and stays in its locked position until the active rotator assembly is swung back separately to its original position, at which time the clamping assembly is automatically unlocked. A safety latch is provided to automatically latch the active rotator assembly to the support table, yet to automatically unlatch the active rotator assembly from the support table when a hatcher tray is positioned thereon. A rotator latch is provided to automatically latch the active and passive rotator assemblies together, and to automatically unlatch the active rotator assembly from the passive rotator assembly when the two rotator assemblies are moved into a transfer position of the active rotator assembly. A variable rate counterbalance assembly is provided to aid in rotation of the active and passive rotator assemblies.

28 Claims, 9 Drawing Sheets

EGG TRANSFER DEVICE

This application is a continuation-in-part application of application Ser. No. 07/756,560, filed Sep. 9, 1991, now U.S. Pat. No. 5,107,794.

BACKGROUND OF THE INVENTION

This invention relates to mechanical devices for the transfer of eggs from one processing station to another processing station, specifically from a climate controlled setter chamber to a climate controlled hatcher chamber where the newborn chicks are hatched.

In the past it has been found that the transferring of eggs from one processing station to another has been greatly facilitated by turning the eggs over as a single group (several dozen) during the transfer, so that the eggs will be transferred from the one tray associated with the one processing station to another tray associated with the other processing station. In many cases, this procedure had been conducted manually, that is, two workman would manipulate the two types of trays as a super-imposed unit, revolving same, 180 degrees for example, so that the transfer of the eggs from the one tray to the other is completed, and then separating the trays after the transfer. During the course of such manual transfer, many eggs would be broken, as much as 5% of the number of eggs transferred for each transfer operation.

It is also known to use mechanical means for effecting such transfer operations, that is, to connect the two aforementioned trays by a mechanical housing and locking means and then rotating the unit about a common axis for the required 180 degrees to effect the transfer. Once the transfer is completed the two housings are separated by rotating one half of the housing back to its original position so that the respective superimposed trays, the tray containing the setter egg flats and the hatcher tray itself can be manually separated from one another. In such cases, however, the manual removal of the one type of tray from the other is a time consuming operation that often results in further egg breakage, owing to the manual interference at this stage in the mechanical transfer operation, with the result in many cases of the one tray being dropped on the other while the two trays are being separated. Not only is time wasted but a considerable amount of egg breakage is encountered, much more, for example, than might be encountered during the mechanical transfer of the eggs themselves.

There is a need, therefore, for an efficient mechanical egg transfer device which will afford an easy and quick transfer of a large number of eggs (several dozen) with minimal or no breakage in a minimum amount of time.

SUMMARY OF THE INVENTION

It is a primary purpose and principle object of the present invention to address the aforementioned needs and provide a mechanical egg transfer device which will simplify the transfer of eggs from a climate controlled egg setter chamber to a climate controlled egg hatcher chamber.

It is a primary feature of the present invention to transfer a large number of eggs in a single operation from a tray of setter egg flats to a hatcher tray in a quick and easy operation that will automatically separate the two trays one from the other, safely and quickly, once the eggs are transferred from the one tray to the other tray, thereby eliminating the need for a time consuming manual step which would normally cause egg breakage.

It is a main feature of the present invention to provide a mechanical egg transfer device which will automatically transfer a large number of eggs (several dozen) from a tray of setter egg flats taken from a climate controlled setter chamber to a hatcher tray intended for deposition in a climate controlled hatcher chamber, without egg breakage and in a minimal amount of time, that is, only the time required to rotate the egg transfer device so that the full hatcher egg tray can be readily removed from the transfer device without fear of egg breakage.

It is yet another feature of the present invention to provide an automatic gripping or clamping means that will secure the tray of setter egg flats to one part of the egg transfer device during egg transfer and for automatically releasing the tray of setter egg flats once the egg transfer is completed and that part of the transfer device is returned to its original position.

It is yet another feature of the invention to include a passive or fixed gripping or clamping means which will not only assist the automatic or active clamping means but will guide the transfer of eggs from the one tray to the other so that none of the eggs will tumble or roll unnecessarily into the hatcher tray during transfer.

It is still another feature of the present invention to mechanically facilitate the rotation of the egg transfer device by means of a counterweight system so that a single worker can operate the device with a minimum of physical effort.

An additional feature of the present invention is the provision of a variable rate counterbalance system which will aid the operator in rotating the active and passive rotator assemblies throughout the rotation paths thereof.

A still additional feature of the invention is to provide a rotator latch assembly for automatically coupling the passive rotator assembly to the active rotator assembly when the passive rotator assembly is pivoted to its transfer position, and for automatically uncoupling the passive rotator assembly from the active rotator assembly when the coupled-together active and passive rotator assemblies are pivoted into a position in which the active rotator assembly is in its transfer position and the passive rotator assembly is in its rest position.

A still further feature of the present invention is to provide a safety latch assembly for latching the active rotator assembly to the base unit when the active rotator assembly is in its rest position in order to prevent pivoting of the active rotator assembly out of the rest position, and for automatically unlatching the active rotator assembly from the base unit when the hatcher tray is mounted atop the active rotator assembly.

BRIEF DESCRIPTION OF THE DRAWINGS

The invention will be better understood and further objects and advantages thereof will become apparent from the following detailed description taken in conjunction with the accompanying drawings, in which.

DETAILED DESCRIPTION OF THE INVENTION

Figure 1:
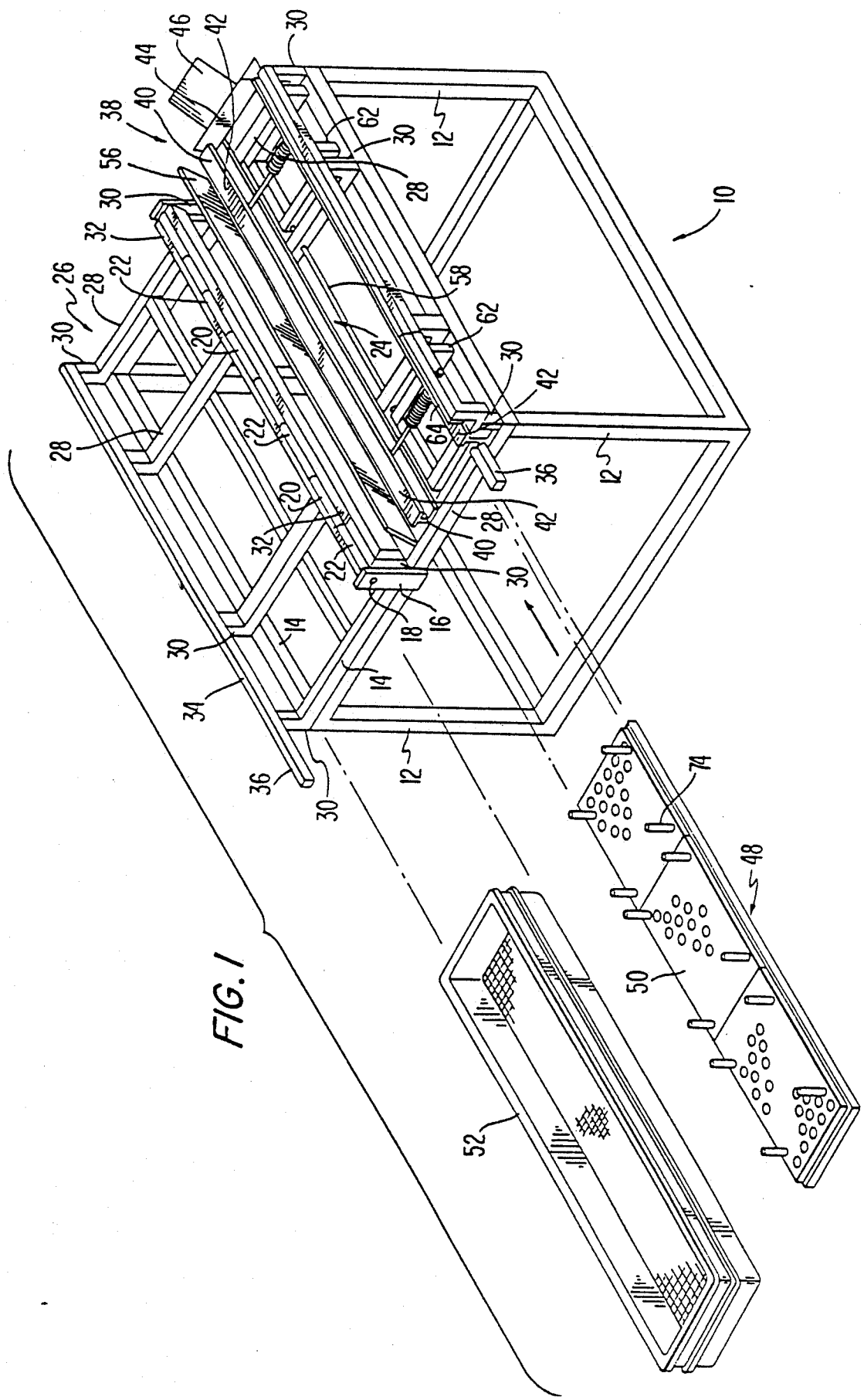
FIG. 1 is a schematic perspective view of an egg transfer device according to a first embodiment of the present invention.

Referring now to FIG. 1, a base unit 10 is shown, which unit may be provided with rollers or castors (not shown) in order to be moved to an appropriate spot near a climate controlled hatcher chamber (not shown) or a climate controlled setter chamber (not shown) which form no part of the present invention. The base unit or table 10 is shown to be constructed from a generally square configuration of upright leg members 12 which support an upper horizontal bracket assembly composed of horizontal strut members 14. Disposed midway along a pair of opposite strut members 14 is a support bracket member 16 for supporting an axle or pivot shaft 18 about which pivots by suitable hinge structures 20 and 22 an active (or first) rotator assembly 24 and a passive (or second) rotator assembly 26.

Each rotator assembly, 24 and 26, is composed of spaced apart horizontal support members 28, the respective ends of which form vertical members 30. The vertical members 30 adjacent the pivot shaft 18 support the respective horizontal members 32 which in turn support the hinge structures 20, 22, so that the hinge structures surround the pivot shaft 18, as shown. The distal vertical members 30 respectively support horizontal members 34, each having an extension handle member portion 36. As can be seen from FIG. 1, the active rotator assembly 24 and the passive rotator assembly 26 are substantially structurally the same and reflect the symmetrical opposite of the other.

Also shown in FIG. 1 is a saddle assembly 38 associated with the active rotator assembly 24, which is made up of a pair of opposed vertical strut members 40 for supporting spaced apart horizontal support strips 42, each strip 42 being at right angles to the vertical struts 40, which in turn are secured to the horizontal support members 28. An end stop member 44 joins these spaced apart members 42 at one end thereof. Connected to the end stop member 44 and extending therefrom at an outwardly extending angle is a hatcher tray guide member 46, to be more fully explained below.

Also shown in FIG. 1 is a slide tool 48 containing three setter egg flats 50 and, as well, a hatcher tray 52. As will be explained more fully below, the slide tray 48 for the setter egg flats is designed to slide into the saddle assembly 38 of the active rotator assembly 24, and the hatcher tray 52 (when full) is designed to fit in the passive rotator assembly 26 and be slid out therefrom along the top surface of the spaced apart horizontal support members 28. Also shown adjacent the saddle assembly 38 is a passive sloped clamping member 56, to be more fully explained below with respect to the active (or automatic) clamping assembly.

Figure 2:
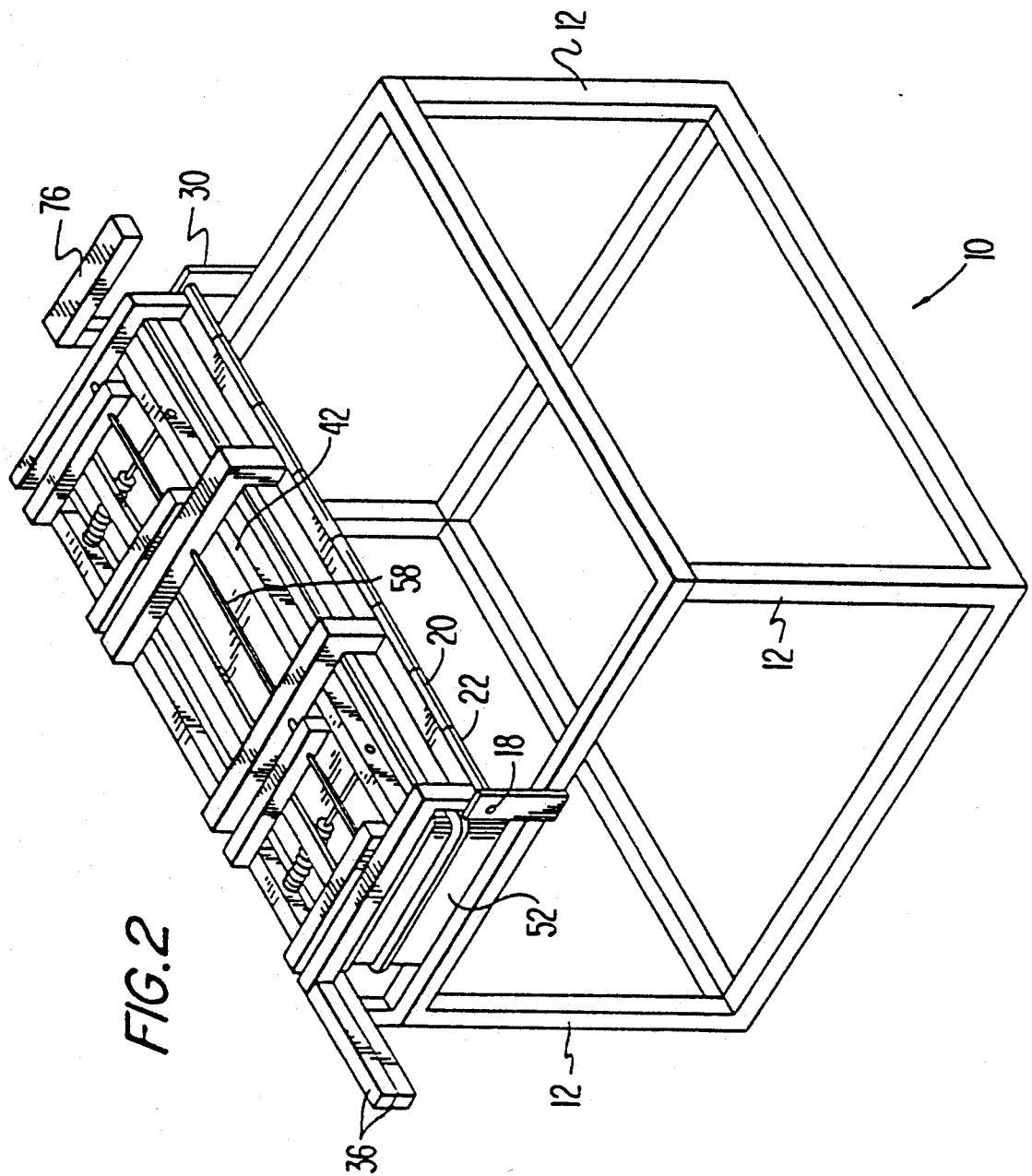
FIG. 2 is a schematic perspective view from the opposite side as shown in FIG. 1 of the egg transfer device of the first embodiment, showing in particular the automatic clamping assembly.
Figure 3:
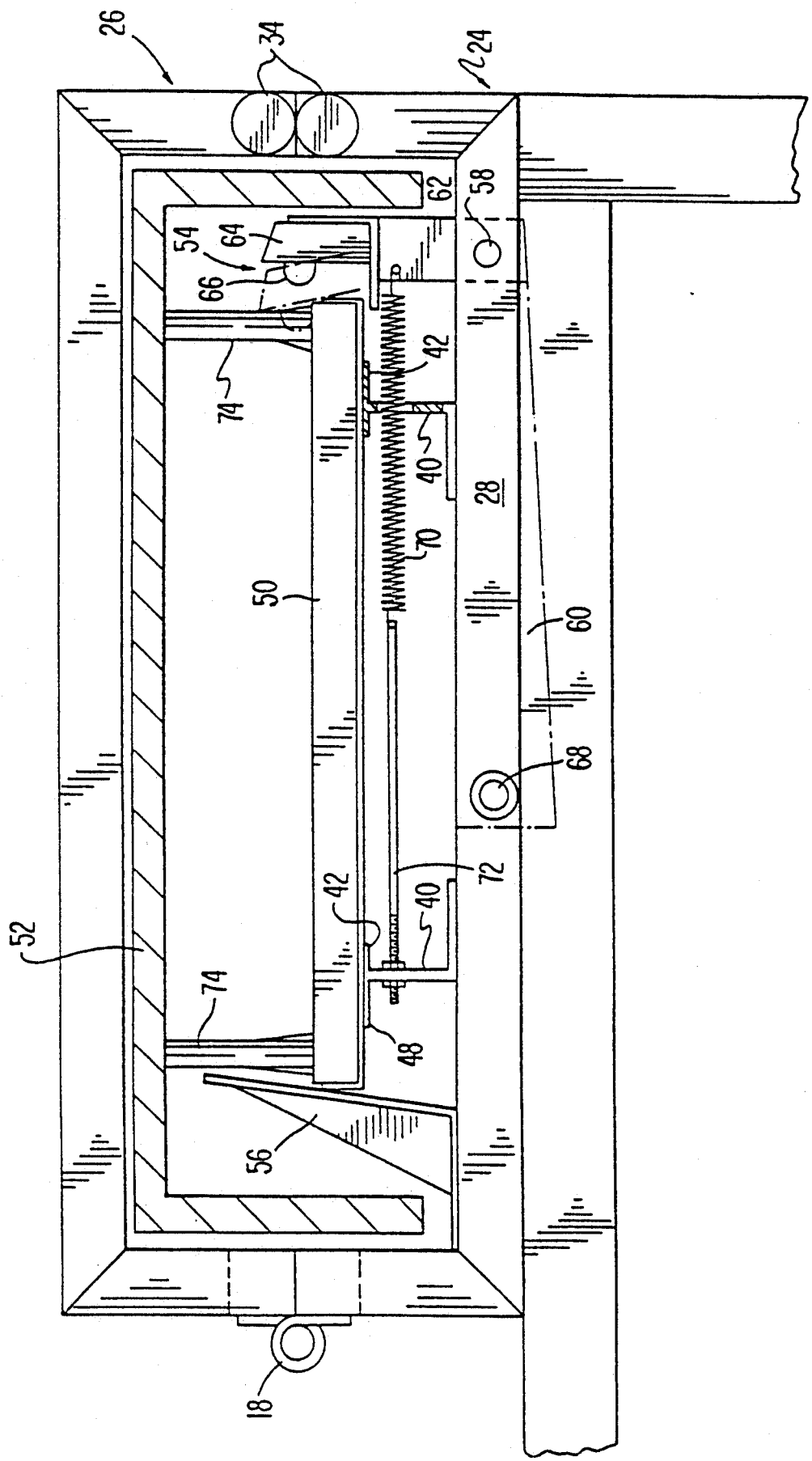
FIG. 3 is a schematic end view of the device of the first embodiment, showing the passive rotator assembly and the active rotator assembly in their superimposed position before their rotation as a unit.

Referring now to FIGS. 2 and 3, there is shown an active clamping assembly 54 associated with the active rotator assembly. Disposed near one end of the active rotator assembly and extending through all of the horizontal support members 28 is a pivot shaft 58 about which are pivoted a pair of identical bracket members 60. The bracket members 60 are rigidly connected to right angle extensions 62 thereof at the point of their pivot about the shaft 58, forming generally L-shaped members; the vertical extensions 62 in turn fixedly support a wooden support member 64 extending substantially the length of the rotator assembly. Fixed to the wooden support member 64 is a foam rubber bulb member 66, also extending the same length as the support member. The foam rubber bulb member 66 may be covered by Neoprene or other suitable protective material. The other ends of the pivotal bracket structures 60 are provided with suitable cam roller members 68, rotatably supported on a suitable shaft extending between the leg members 60. It is conceivable, however, that the cam rollers may be replaced by a simple strut member that would have the same camming action (to be explained below) as the rollers. The active clamping assembly is normally biased into its setter egg flat gripping position by means of the coil springs 70 connected at respective first ends thereof to the vertical extension members 62 and at their other respective ends to adjustable spring tension adjustment rod members 72 which are threaded for this purpose in suitable apertures provided in the vertical support members 40. Thus, the spring members 70 pull on the vertical extension members 62 of the L-shaped bracket members 60, causing the entire automatic clamping mechanism to pivot about the shaft 58 so that the bulb member swings past the plane defining the edge of the setter egg flats that are disposed in the saddle assembly and thereby engage same. Only when the active rotator assembly is resting on the base is the active clamping assembly automatically brought into its non-gripping position, since in this case the base unit or table acts as a camming surface against the cam roller members 68 against the bias of the spring members 70. The bracket members 60 will then pivot about the shaft 58 causing the bulb member 66 to swing back out of the plane defining the edge of the setter egg flats and into a non-gripping position. It will be seen that the setter egg flats are also provided with vertical extension posts 74 that not only secure the egg flats against their support in the saddle assembly, once the passive rotator is brought into position atop the active rotator, but also provide a surface of resistance against which the gripping action of the bulb member 66 takes place.

Connected at one end of the active rotator assembly is a counterweight extension member 76 that, by swinging in a downward gravity-assisted direction, acts to assist the force required to rotate the two assemblies or just the one active rotator assembly.

The operation of the egg transfer device of this first embodiment is as follows. As shown in FIG. 1, a slide tool 48 of three full setter egg flats 50 is slid into the saddle assembly 38 (in the direction of the arrow) and is caused to come to a stop by the end stop member 44. The empty hatcher tray is now placed over the setter egg flats and is guided into place by the guide member 46, so that the bottom of the hatcher tray comes to rest on the upright posts 74 extending from the setter egg flats 50. It is important to note at this time that the automatic or active clamping mechanism 54 is in its non-gripping position and will remain so, as long as the active rotator member is resting on the table 10 in its rest position; this position, of course, allows the slide tool 48 of the setter egg flats to slide into position on the saddle assembly 38 without interference. Now the passive rotator assembly 26 is rotated from its rest position about the common pivot shaft 18 until it is positioned in its transfer position atop the active rotator assembly 24, such as shown in FIG. 3. The two handle members 36 are gripped by the operator, only one operator being needed, and both assemblies, the active and passive assemblies 24 and 26, are rotated as a single unit about their common pivot shaft 18. Once the active rotator assembly 24 leaves the table 10, the active clamping mechanism 54 becomes activated by virtue of the spring bias action on the bracket members 60, thereby causing the L-shaped members to rotate about the shaft 58, which in turn causes the bulb member 66 to press against the side of the setter egg flats 50 as well as the upright posts 74. At the same time the slide tool 48 bears against the passive or fixed clamp 56 on the opposite side of the setter egg flats.

Also, counterweight extension member 76, by means of its gravity assisted movements in an opposite and downward direction to that of the angular direction in which the rotator assemblies 24, 26 are being rotated, lessens considerably the force required to rotate the assemblies. As the eggs transfer themselves from the setter egg flats 50 to the hatcher tray 52 during the course of the rotary movement of the rotator assemblies, the fixed clamp member 56, by means of its extension into the interior space of the hatcher tray 52, will help guide the eggs into the hatcher tray and will prevent, as well, any eggs from tumbling or rolling in a downward direction to the side wall when it becomes the bottommost surface of the hatcher tray 52 during the egg transfer.

When the rotator assemblies are fully rotated 180 degrees, the active rotator can be returned to its original position without fear of the setter egg flats gripped therein falling out, since the active clamping mechanism 38 remains active or in its locking position so long as the active rotator assembly 24 is away from the level surface of the table 10. Once the active rotator assembly is returned to its rest position on the table 10, the active clamping mechanism 54 is cammed into its non-gripping or locking position by reason of the camming rollers coming into contact with the table and thus rotating the L-shaped brackets 60 against the bias of the spring members 70 so that the bulb member 66 comes out of contact with the setter egg flats. The hatcher egg tray, which is now full, can be removed from the passive rotator assembly by simply sliding the tray therefrom, as shown in FIG. 1. Similarly, the slide tool 48 with the empty setter egg flats 50 thereon can also be slid from the active rotator assembly 24, thus readying the egg transfer device for another automatic egg transfer operation.

Next, a second preferred embodiment of the present invention will be described with reference to FIGS. 4-9. The basic operation of this second embodiment is similar to that of the first embodiment shown in FIGS. 1-3. However, the structure and function of this second embodiment differ somewhat from the first embodiment, in that various features have been slightly modified, and other features have been added.

Figure 4:
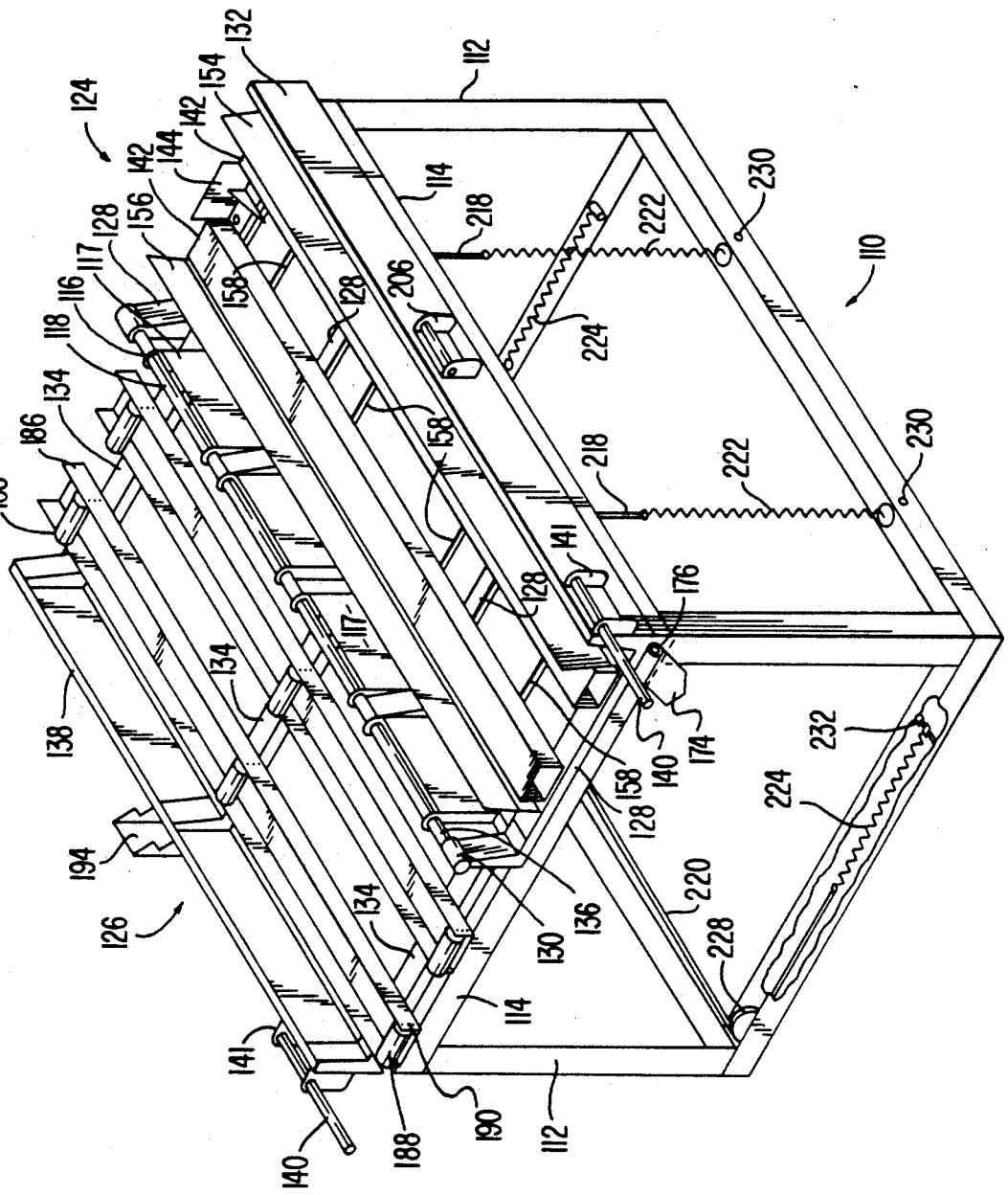
FIG. 4 is a perspective view of a second embodiment of the egg transfer device of the present invention.
Figure 5:
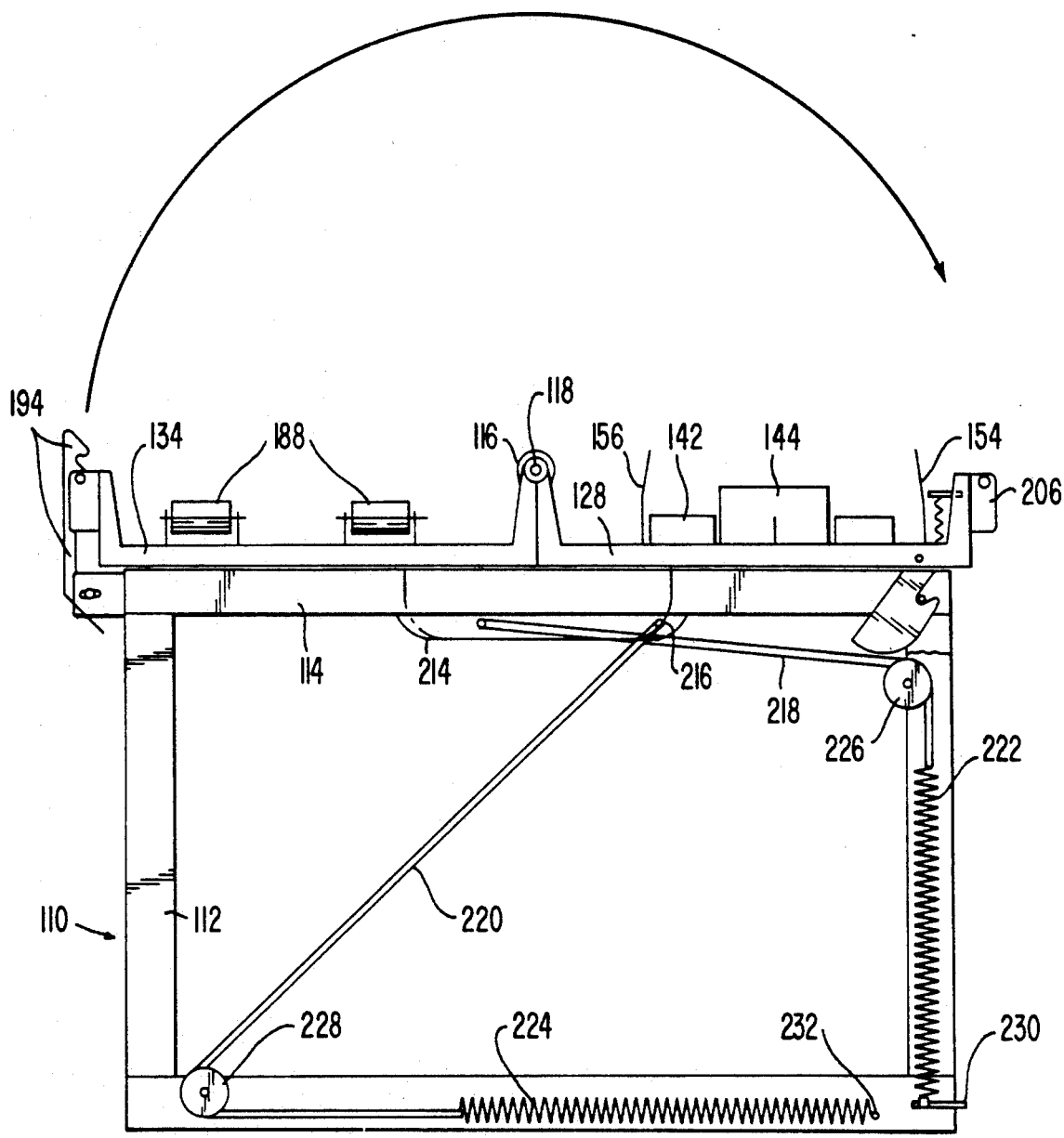
FIG. 5 is a front view of the egg transfer device shown in FIG. 4.
Figure 6:
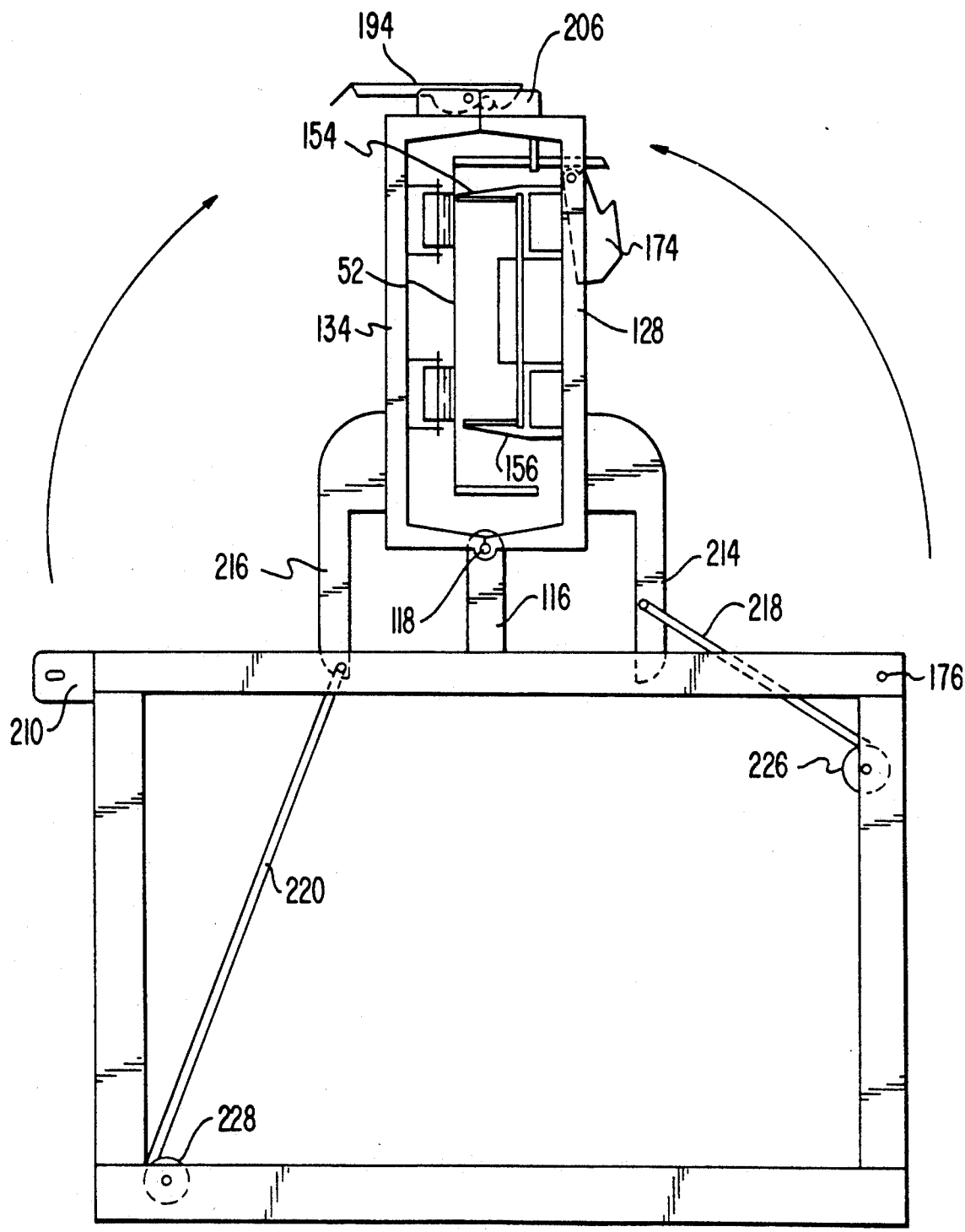
FIG. 6 is a view similar to FIG. 5, except with rotator assemblies thereof pivoted into upright positions.

Referring now especially to FIGS. 4-6, the egg transfer device of this second embodiment includes a base unit 110 having a plurality of upright leg members 112 and horizontal strut members 114. A plurality of support yokes 116 are fixed atop the horizontal strut members 114 of the base unit 110. Each of the support yokes 116 is formed in a substantially U-shape with a striking plate 117 spanning between the two upright legs of the U-shaped support yoke 116. Each of these upright legs of the support yoke 116 has a hole formed therethrough for receipt of a pivot shaft 118, such that the pivot shaft is supported by the plurality of support yokes 116.

As in the first embodiment, this second embodiment includes an active rotator assembly 124 and a passive rotative assembly 126. The active rotator assembly 124 includes a plurality of U-shaped support members 128, each of which has a pivot shaft receiving portion 130 for rotatably mounting the U-shaped support members 128 of the active rotator assembly 124 to the pivot shaft 118. The active rotator assembly also includes a horizontal outer end member 132 fixed to the outer ends of the U-shaped support members 128, thereby fixing all of the U-shaped support members 128 together so that they rotate together as a unit about the pivot shaft 118. Likewise, the passive rotator assembly 126 includes a plurality of U-shaped support members 134, each of which has a pivot shaft receiving portion 136 for rotatably mounting the U-shaped support members 134 of the passive rotator assembly 126 to the pivot shaft 118. The passive rotator assembly also includes a horizontal outer end member 138 fixed to the outer ends of the U-shaped support members 134 so as to fix the U-shaped support members 134 together for rotation about the pivot shaft 118. These horizontal outer end members 132, 138 are preferably formed of inwardly facing U-channel members and are fitted over the outer ends of the U-shaped support members 128, 134, respectively. As best shown in FIG. 4, each of the horizontal outer end members 132, 138 of the active and passive rotator assemblies 124, 126, respectively, has a rotator handle 140 mounted to one end thereof by way of a rotator handle bracket 141. The grip portions of these handles 140 are preferably rotatable relative to the outer end members 132, 138, respectively. This is contemplated as being accomplished by either having the handles 140 rotatable relative to the brackets 141 or having sleeves (not shown) rotatably mounted about the handles 140. These handles 140 are, of course, for use in rotating the active and passive rotator assemblies 124, 126 between their rest positions shown in FIG. 4 and their transfer positions (the transfer position of only the passive rotator assembly 126 is shown in FIG. 9; the transfer position of the active rotator assembly 124 being likewise atop the passive rotator assembly 126 when the passive rotator assembly 126 is in its rest position).

Figure 9:
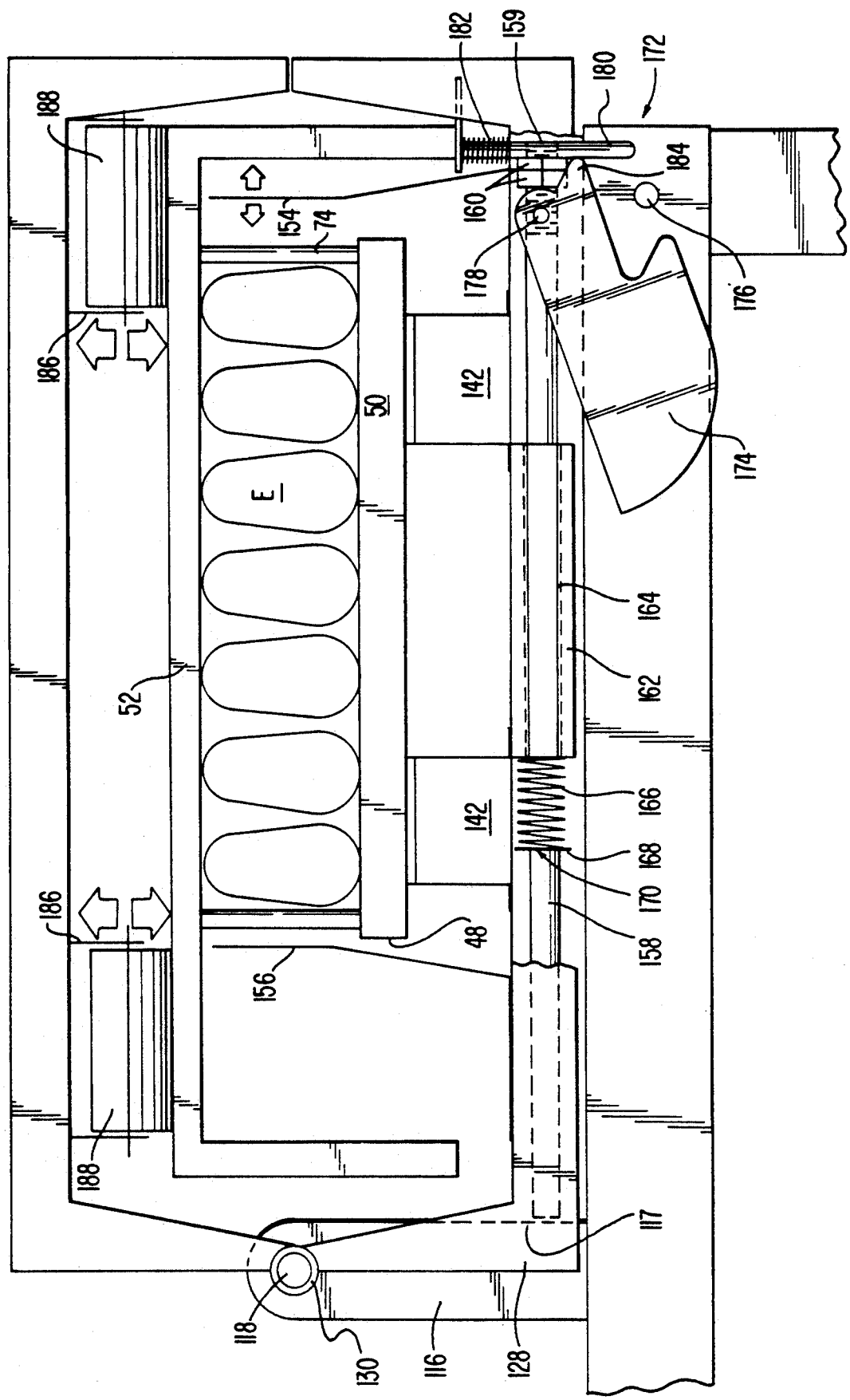
FIG. 9 is an enlarged front view of a right side portion of the egg transfer device of the second embodiment.

Fixed atop the U-shaped support members 128 of the active rotator assembly 124 are a pair of active rotator saddle members 142 which can be formed of any suitable structural elements, but, as best seen in FIG. 9, are preferably formed of inverted U-shaped channel members. These active rotator saddle members serve to also fix together the U-shaped support members 128 of the active rotator assembly 124, and also to receive the egg flat slide tool 48 and egg flats 50 (see FIGS. 6 and 9). An egg flat end stop member 144 is also provided to limit the extent the egg flats 50 can be slid along the saddle members 142. In a somewhat like manner, the passive rotator assembly 126 is provided with a pair of passive rotator saddle members 186 which are preferably formed of U-shaped channel members, and which are fixed to the U-shaped support members 134 of the passive rotator assembly 126. Height adjustable saddle rollers 188 are mounted in longitudinally spaced apart locations in the saddle members 188 and are adapted to rollingly receive the hatcher tray 52 (see FIGS. 6 and 9). The height of these rollers can be adjusted by selectively mounting the pivot shafts of the rollers 188 in one of the plurality of adjustment holes 190 formed through the sides of the saddle members 186.

As best shown in FIG. 9, the active rotator assembly 124 is provided with a clamping assembly for automatically clamping the egg flats 50 to the active rotator assembly 124 when the active rotator assembly is pivoted out of its rest position shown in FIG. 9, and for automatically releasing the egg flats 50 when the active rotator assembly 124 is moved into its rest position shown in FIG. 9. This clamping assembly includes an active clamp 154 which is movable toward and away from the egg flats 50 as shown by arrows in FIG. 9, and a passive clamp 156 which is fixed relative to the egg flats and relative to the active rotator assembly 124. This clamping assembly further includes a plurality of push rods 158 (see FIG. 4, which shows the clamping assembly as including four push rods 158) slidably mounted to the active rotator assembly 124 through holes 164 formed through push rod guide blocks 162 which are fixed to the active rotator assembly 124. Each of the push rods 158 is provided at its outer end with external threads 159 which cooperate with adjustment nuts 160 to adjustably fix the active clamp 154 to the push rods 158 for movement therewith. The push rods 158 are biased toward the left in FIG. 9 (i.e. toward a clamping position of the active clamp 154) by push rod biasing springs 166 which are interposed between the guide blocks 162 and spring retaining washers 168 held in place by spring retaining pins 170. These biasing springs 166 are effective to bias the push rods 158 into engagement with the striking plates 117 of the support yokes 116 in the rest position of the active rotator assembly 124. Thus, when the active rotator 124 is pivoted out of its rest position such that the lower left ends (as shown in FIG. 9) of the U-shaped support members 128 move away from the striking plates 117, the push rods 158 are moved inwardly and carry the active clamps 154 therewith and into engagement with the egg flats 50. When, on the other hand, the active rotator assembly is again pivoted into its rest position, the inner ends of the push rods 158 again engage with the striking plates 117 such that the push rods 158 are moved outwardly against the bias of springs 166 to release engagement of the active clamp 154 from the egg flats 50.

As also best shown in FIG. 9, the egg transfer device of this second embodiment is provided with a hatcher tray safety latch assembly 172 for latching the active rotator assembly 124 to the base unit 110 when the active rotator assembly 124 is in its rest position to prevent pivoting of the active rotator assembly 124 out of the rest position, and for automatically unlatching the active rotator assembly 124 from the base unit 110 when the hatcher tray 52 is mounted atop the active rotator assembly 124 as shown in FIG. 9. Thus, this hatcher tray safety latch assembly 172 is effective to prevent pivoting of the active rotator assembly 124 out of its rest position unless the hatcher tray 152 is positioned atop the active rotator assembly 124 as shown in FIG. 9, thereby preventing the eggs E arranged in the egg flats 50 from being inadvertently dumped from the egg flats 50 due to pivoting of the active rotator assembly 124 from its rest position when no hatcher tray 52 is present over the egg flat 50 to receive the eggs E. The hatcher tray safety latch assembly 172 includes a latch bolt 176 fixed to the base unit 110, and a safety latch 174 pivotably mounted to the active rotator assembly 124 by a latch pivot shaft 178, such that the safety latch 174 is pivotable between a latched position as shown in FIG. 5 and an unlatched position as shown in FIG. 9. The safety latch 174 is normally held in the latched position simply due to the weight of the safety latch 174. However, a spring or the like can be provided for biasing the safety latch toward the latched position. The safety latch assembly 172 also includes a plunger 180 vertically slidably mounted to the active rotator assembly 124 for movement between a lowered position as shown in FIG. 9 and a raised position. In the preferred embodiment, this plunger 180 is slidably mounted through a hole formed in the forwardmost one of the U-shaped support members 128 of the active rotator assembly 124. A plunger biasing spring 182 is interposed between the active rotator assembly 124 and a head of the plunger so as to bias the plunger 180 into its upper position. When the hatcher tray 52 is mounted atop the active rotator assembly 124 as shown in FIG. 9, the outer edge of the hatcher tray 52 presses downwardly against the head of the plunger 180 to force it downwardly against the bias of biasing spring 182, such that the bottom end of the plunger 180 presses against a contact arm 184 of the safety latch 174 to pivot the safety latch 174 out of the latching position. The plunger biasing spring 182 can have a spring constant such that the weight of the hatcher tray 52 alone will not force the plunger downwardly, but will only force the plunger downwardly if the passive rotator assembly is also pressed downwardly against the hatcher tray. However, this is not essential, and it is sufficient if the spring 182 can be forced downwardly merely by the weight of the hatcher tray. Although only one such hatcher tray safety latch assembly 172 is shown in the drawing figures and is necessary for proper operation, it is evident that two such safety latch assemblies can be provided, one at each end of the active rotator assembly 124.

Figure 7:
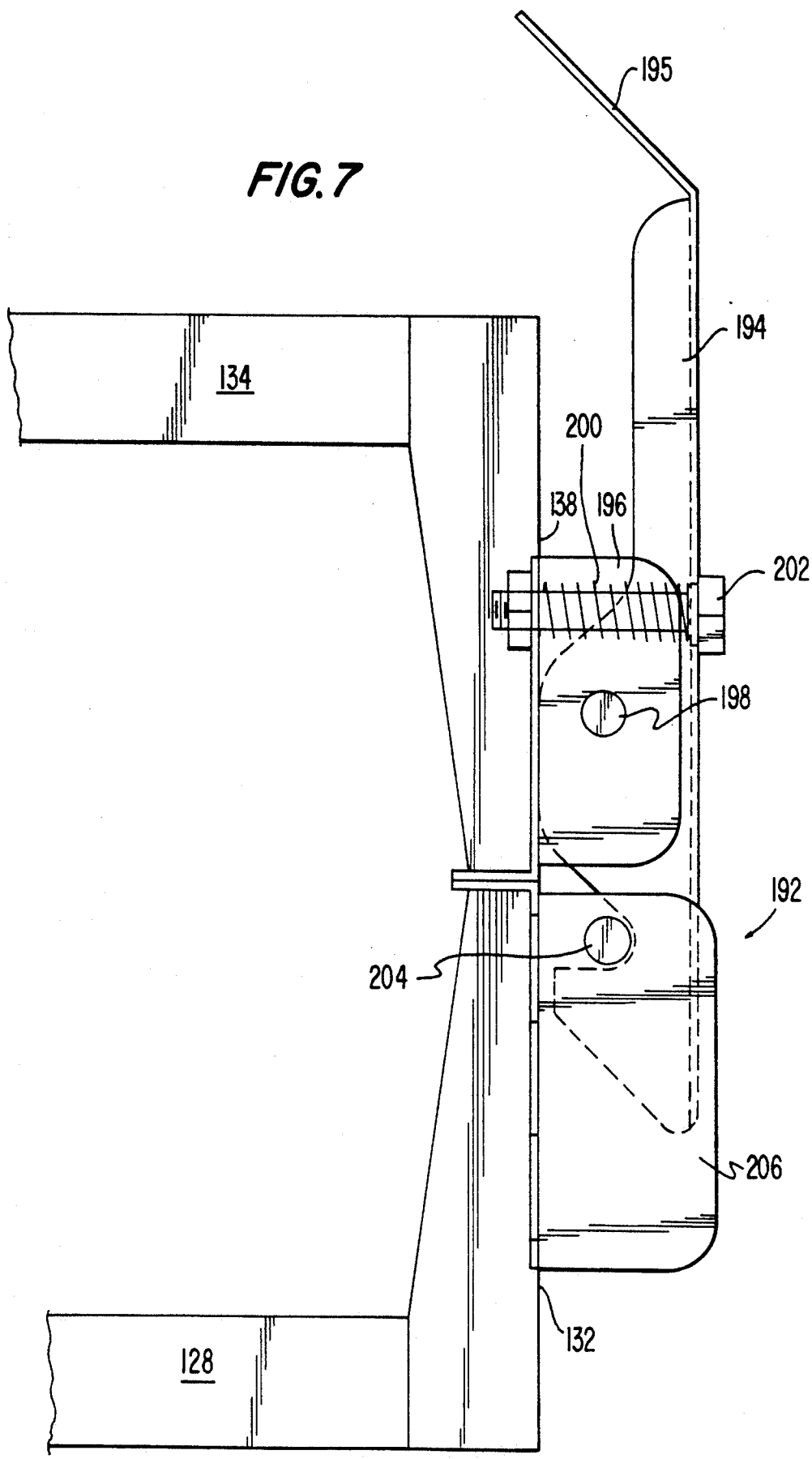
FIG. 7 is an enlarged front view of a rotator latch assembly of the second embodiment, with the rotator latch assembly in a latched position.
Figure 8:
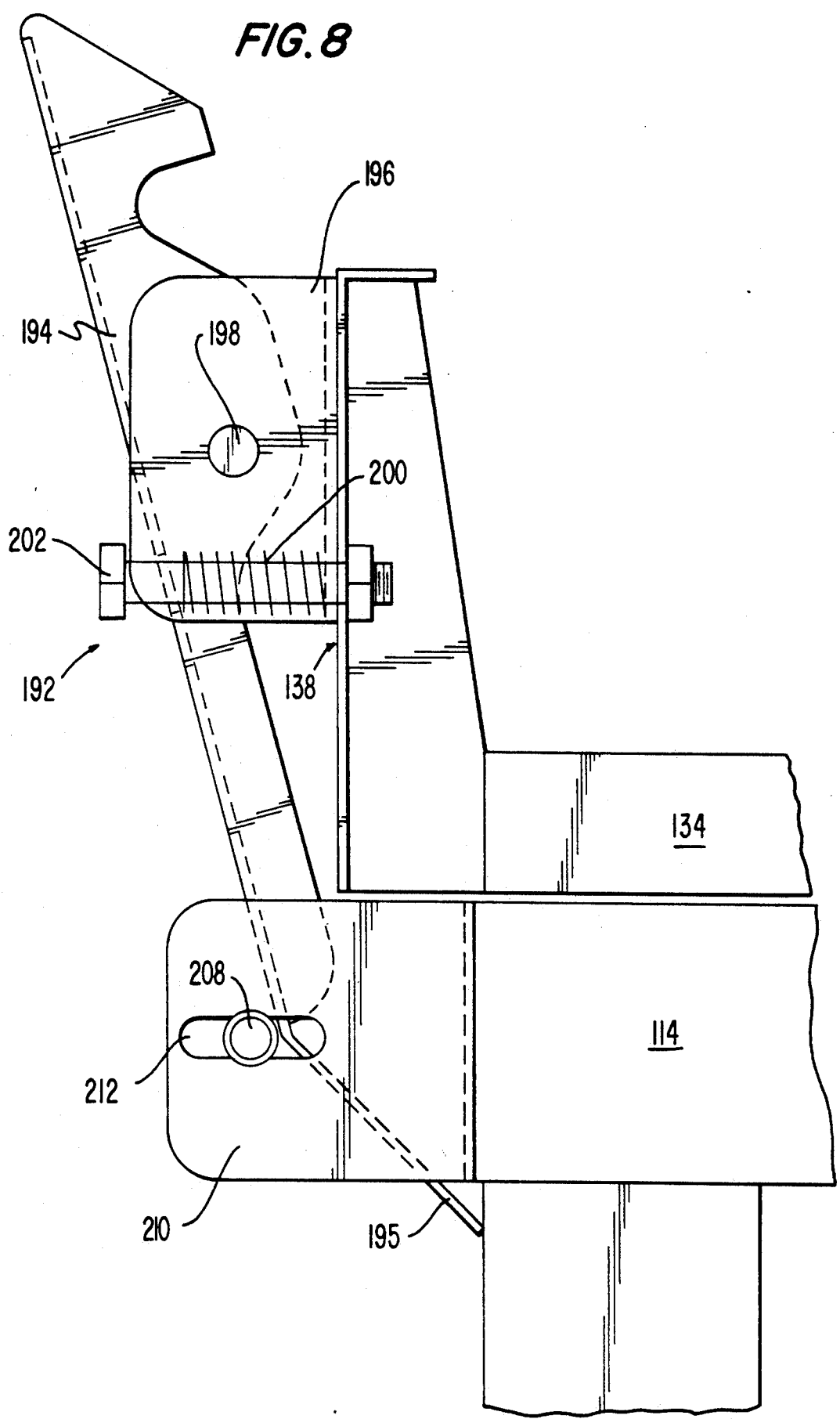
FIG. 8 is a plan view of a portion of the rotator latch assembly, including an unlatching assembly therefore.

Next, as best shown in FIGS. 7 and 8, the rotator latch assembly 192 is provided for automatically coupling the passive rotator assembly 126 to the active rotator assembly 124 when the passive rotator assembly 126 is pivoted to its transfer position, and for automatically uncoupling the passive rotator assembly 126 from the active rotator assembly 124 when the coupled-together active and passive rotator assemblies 125, 126 are pivoted into a position in which the active rotator assembly 124 is in its transfer position and the passive rotator assembly 126 is in its rest position. Note that the latched or coupled position of the rotator latch assembly 192 is shown in FIG. 7, and that the unlatched or uncoupled position of the rotator latch assembly 192 is shown in FIG. 8. The rotator latch assembly 192 includes a rotator latch 194 pivotably mounted to the outer end member 138 of the passive rotator assembly 126 by a rotator latch pivot shaft 198 and a rotator latch bracket 196. A rotator latch biasing compression spring 200 is mounted about a rotator latch spring guide bolt 202, and acts to bias the rotator latch 194 toward its latched position shown in FIG. 7. As also shown in FIG. 7, the rotator latch 194 is engageable with a rotator latch bolt 204 fixed to the outer end member 132 of the active rotator assembly 124 by a rotator latch bolt bracket 206. Further, as best shown in FIG. 8, an adjustable rotator latch disengagement roller 208 is mounted to the base unit 110 by a rotator latch disengagement bracket and is horizontally adjustable within the bracket 210 due to the provision of elongated adjustment holes 212. With this arrangement, when the passive rotator assembly 126 is pivoted into its transfer position as shown in FIG. 7, the rotator latch 194 automatically engages with the rotator latch bolt 204. Note that the engaging end of the rotator latch 194 is cam shaped, such that upon being pressed against the latch bolt 204, it rides therealong to force the rotator latch 194 against the biasing spring 200 until the latching recess of the rotator latch 194 engages with the latch bolt 204. On the other hand, when the active and passive rotator assemblies 124, 126 are coupled together and pivoted from the position shown in FIG. 7 (i.e. the rest position of the active rotator assembly 124 and the transfer position of the passive rotator assembly 126) and into a position in which the passive rotator assembly is in its rest position, a rotator latch tail 195 of the rotator latch 194 engages with the rotator latch disengagement roller 208. Due to the angle of the rotator latch tail 195 relative to the main portion of the rotator latch 194, the rotator latch tail 195 will ride along the roller 208 to force the rotator latch 194 to pivot to an unlatching position against the bias of the rotator latch biasing compression spring 200, to thereby disengage or uncouple the active rotator assembly 124 from the passive rotator assembly 126.

The provision of this rotator latch assembly 192 ensures that during transfer of eggs E from the egg flats 50 clamped to the active rotator assembly 124 to the hatcher tray 52 mounted in the passive rotator assembly 126, the active and passive rotator assemblies will be securely engaged during the entire pivoting motion of the two rotator assemblies from one side of the base unit 110 to the other. Because the rotator latch assembly 192 automatically engages with the rotator latch bolt 204 when the passive rotator assembly 126 is pivoted into its transfer position atop the active rotator assembly 124, and because the rotator latch assembly 192 is automatically disengaged from the latch bolt 204 when the active and passive rotator assemblies 124, 126 are pivoted into the rest position of the passive rotator assembly 126 and the transfer position of the active rotator assembly 124, it is unnecessary for the operator of the egg transfer device to perform such coupling and uncoupling steps. This omission of such manual steps by the operator results in fewer operating errors, and thus less egg breakage.

Because the active and passive rotator assemblies 124, 126 are relatively heavy, especially when loaded with eggs, the egg transfer device of this second embodiment is also provided with a variable rate counterbalance system. In the first embodiment described above with reference to FIGS. 1-3, the counterweight extension member 76 is provided to aid in rotation of the rotator assemblies 24, 26. However, the variable counterbalance system of this second embodiment is able to aid in rotation throughout the paths of the rotator assemblies. That is, this variable counterbalance system is effective to urge the active rotator assembly 124 towards its transfer position when the active rotator assembly 124 is positioned on a side of the overcenter position (i.e. the position of the rotator assemblies 124, 126 in which the weight thereof does not tend to urge them toward either the rest positions or the transfer positions) opposite the transfer position of the active rotator assembly 124, to urge the active rotator assembly 124 toward its rest position when the active rotator assembly is positioned on a side of the overcenter position opposite its rest position, to urge the passive rotator assembly toward its transfer position when it is positioned on a side of the overcenter position opposite its transfer position, and to urge the passive rotator assembly 126 toward its rest position when it is positioned on a side of the overcenter position opposite its rest position. Thus, with this variable rate counterbalance system, the force required of the operator to pivot one or both of the rotator assemblies 124, 126 is lessened at any and all positions of the rotator assemblies. That is, this counterbalance system is effective to not only aid in raising the rotator assemblies, but to also aid in lowering the rotator assemblies without the weight of the rotator assemblies unduly pulling downwardly against the operator.

More specifically, this variable rate counterbalance system includes, as best shown in FIGS. 4 and 5, a pair of active rotator counterbalance brackets 214 fixed to and extending downwardly from the active rotator assembly 124, a pair of passive rotator counterbalance brackets 216 fixed to and extending downwardly from the passive rotator assembly 126, a pair of active rotator counterbalance cables 218 attached to and extending from the active rotator counterbalance brackets 214, a pair of passive rotator counterbalance cables 220 attached to and extending from the passive rotator counterbalance brackets 216, a pair of active rotator counterbalance springs 222 attached to respective free ends of the active rotator counterbalance cables 218, a pair of passive rotator counterbalance springs 224 attached respectively to free ends of the passive rotator counterbalance cables 220, a pair of active rotator counterbalance spring retainer bolts 230 fixed to the base unit 110 and engaging respective free ends of the active rotator counterbalance springs 222, and passive rotator counterbalance spring retainer bolts 232 fixed to the base unit 110 and engaging respective free ends of the passive rotator counterbalance springs 224. In addition, the counterbalance system includes active and passive rotator counterbalance pulleys 226, 228 rotatably mounted to the base unit 110 and about which the respective active and passive rotator counterbalance cables 218, 220 are trained. As best shown in FIG. 6, each of the counterbalance brackets 214, 216 is L-shaped and has respective counterbalance cables 218, 220 attached thereto at predetermined locations of a horizontally extending (i.e. horizontally extending when the rotator assemblies are in their rest positions) portions of the counterbalance brackets 214, 216.

Thus, in operation of this egg transfer device according to the second embodiment of this invention, the egg flat containing eggs E will be positioned on the active rotator saddle members 142 and the hatcher tray 52 will be positioned overtop the egg flats 50 to rest on the vertical extension posts 74. When the hatcher tray 52 is in place, it will force the plunger 180 downwardly to unlatch the safety latch 174 to uncouple the active rotator assembly from the base unit. The operator will then grip the handle 140 of the passive rotator assembly 126 and pivot the passive rotator assembly 126 into its transfer position shown in FIG. 9. During the pivoting of the passive rotator assembly 126, the passive counterbalance spring 224 will aid in the raising of the passive rotator assembly 126 into its overcenter position and then aid in the lowering of the passive rotator assembly 126 beyond the overcenter position. When the passive rotator assembly 126 reaches its transfer position, as shown in FIGS. 7 and 9, the rotator latch 194 will automatically engage with the rotator latch bolt 204 to couple the active and passive rotator assemblies 124, 126 together. Then, from the position shown in FIG. 9, the operator will grip the handles 140 of the active and passive rotator assemblies 124, 126 and pivot the coupled-together rotator assemblies to the opposite side of the base unit 110.

As the coupled-together active and passive rotator assemblies are pivoted toward the opposite side of the base unit 110 from that shown in FIG. 9, the inner bottom ends of the U-shaped support members 128 will move away from the striking plates 117 and allow the push rod biasing springs 166 to force the push rods 158 inwardly such that the active clamp 154 will engage against the egg flats 50 to clamp the egg flats 50 to the active rotator assembly. As the coupled-together active and passive rotator assemblies are pivoted about the pivot shaft 118, both the active and passive rotator counterbalance springs 222, 224 will aid in the raising and lowering thereof. When the coupled-together active and passive rotator assemblies 124, 126 reach the rest position of the passive rotator assembly and the transfer position of the active rotator assembly, the tail 195 of the rotator latch 194 will engage with the disengagement roller 208 to force the rotator latch 194 out of the latching position, such that the active and passive rotator assemblies are uncoupled. The active rotator assembly 124 can then be pivoted back to its rest position. During the pivoting of the active rotator assembly 124 to its rest position, the egg flats 50 will be retained between the active and passive clamps 154, 156, but when the active rotator assembly 124 reaches its rest position, the push rods will be forced outwardly due to engagement with the striking plate 117 such that the active clamp 154 will be moved out of engagement with the egg flats 50 to allow the egg flats 50 to be removed. The hatcher tray with the eggs therein can then be rolled off of the rollers 188 and out of the passive rotator assembly 126.

Although the structural members of the two disclosed embodiments of the invention can be formed of any suitable material, it is contemplated that they be formed of stainless steel. Further, the active and passive clamps can be formed with their inner faces smooth or roughened or can have a roughened sheet mounted thereon to provide proper gripping characteristics. However, in the preferred form of the invention, the active and passive clamps are formed of stainless steel with their inner faces sand blasted to provided a suitably rough surface for gripping.

It is to be noted that, although the egg transfer device has been described for use with the hatcher tray 52, slide tool 48 and egg flats 50, these apparatus do not form a part of the present invention. Further, although FIG. 1 shows three egg flats disposed on the slide tool 48, the egg flats can be obtained in various sizes such that one to four egg flats could be received on the slide tool. The dimensions of the slide tool and hatcher tray can also vary. Such differing dimensions can, however, be accommodated by the egg transfer device. For example, the position of the active clamp 154 can be adjusted by nuts 160, and the height of rollers 188 can be adjusted by selectively mounting their pivot shafts in holes 190.

Although the various features of the present invention have been described with references to particular embodiments, it is clear that various modifications can be made within the scope of the invention. For example, it is contemplated that the mechanical automatic safety latch 174 and mechanical automatic rotator latch 194 can be replaced by electronically activated latches responsive to electronic sensors for detecting the various positions of the active and passive rotator assemblies. It is further contemplated that the manual pivoting of the rotator assembly could be performed by, for example, an electric motor, and/or that the counterbalance assembly could be replaced by a power assist type assembly. Other modifications will be apparent to those skilled in the art.

What is claimed is:

1. An egg transfer device comprising:
   a base unit having a horizontal upper support surface;
   a horizontal pivot shaft supported on said base unit;
   a first rotator assembly rotatably mounted to said pivot shaft for pivotal movement between a first rest position in which its contacts said base unit and a first transfer position, said first rotator assembly being adapted to receive an egg flat;
   a second rotator assembly rotatably mounted to said pivot shaft, separately from said first rotator assembly, for pivotal movement between a second rest position in which it contacts said base unit and a second transfer position, said second rotator assembly being adapted to receive a hatcher tray; and
   rotator latch means for automatically coupling said second rotator assembly to said first rotator assembly when said second rotator assembly is pivoted to said second transfer position, and for automatically uncoupling said second rotator assembly from said first rotator assembly when the coupled together first and second rotator assemblies are pivoted into a position in which said first rotator assembly is in said first transfer position and said second rotator assembly is in said second rest position.

2. An egg transfer device as recited in claim 1, wherein
   each of said first and second rotator assemblies includes an inner end pivotably mounted to said pivot shaft, and an outer end opposite said inner end; and
   said rotator latch means comprises a rotator latch bolt fixed to said outer end of one of said first and second rotator assemblies, a rotator latch pivotably mounted to said outer end of the other of said first and second rotator assemblies for movement between a latching position in which said rotator latch can engage with said rotator latch bolt and an unlatching position in which said rotator latch can disengage from said rotator latch bolt, rotator latch spring means for biasing said rotator latch toward said latching position, and an unlatching means for forcing said rotator latch against the bias of said rotator spring means and into said unlatching position when said other of said first and second rotator assemblies is moved into a respective one of said first and second rest positions.

3. An egg transfer device as recited in claim 2, wherein
   said rotator latch includes a tail portion which, when said other of said first and second rotator assemblies is in a respective one of said first and second rest positions, extends downwardly; and said unlatching means comprises an unlatching bracket fixed to an end of said base unit adjacent said outer end of said other of said first and second rotator assemblies when in a respective one of said first and second rest positions, and an unlatching roller rotatably mounted to said unlatching bracket, such that when said rotator latch is moved toward said unlatching roller said tail portion of said rotator latch engages with said unlatching roller and forces said rotator latch into said unlatching position.

4. An egg transfer device as recited in claim 2, wherein
said one of said first and second rotator assemblies comprises said first rotator assembly, and said other of said first and second rotator assemblies comprises said second rotator assembly.

5. An egg transfer device as recited in claim 1, further comprising
safety latch means for latching said first rotator assembly to said base unit when said first rotator assembly is in said first rest position to prevent pivoting of said first rotator assembly out of said first rest position, and for automatically unlatching said first rotator assembly from said base unit when the hatcher tray is mounted on said first rotator assembly.

6. An egg transfer device as recited in claim 1, further comprising
counterbalancing means for providing counterbalancing forces to counterbalance the weight of said first and second rotator assemblies and aid in the rotation of said first and second rotator assemblies between said first and second rest positions and said first and second transfer positions, respectively.

7. An egg transfer device as recited in claim 6, wherein
said first rotator assembly is pivotable to a first overcenter position, intermediate said first rest position and said first transfer position, in which the weight of said first rotator assembly does not tend to urge it toward either said first rest position or said first transfer position;
said second rotator assembly is pivotable to a second overcenter position, intermediate said second rest position and said second transfer position, in which the weight of said second rotator assembly does not tend to urge it toward either said second rest position or said second transfer position; and
said counterbalancing means is operable to provide variable counterbalancing forces effective to urge said first rotator assembly toward said first transfer position when said first rotator assembly is positioned on a side of said first overcenter position opposite said first transfer position, to urge said first rotator assembly toward said first rest position when said first rotator assembly is positioned on a side of said first overcenter position opposite said first rest position, to urge said second rotator assembly toward said second transfer position when said second rotator assembly is positioned on a side of said second overcenter position opposite said second transfer position, and to urge said second rotator assembly toward said second rest position when said second rotator assembly is positioned on a side of said second overcenter position opposite said second rest position.

8. An egg transfer device as recited in claim 1, further comprising
clamping means mounted to said first rotator assembly and responsive to movement thereof with respect to said base unit for automatically engaging the egg flat in said first rotator assembly when said first rotator assembly is moved from said first rest position toward said transfer position.

9. An egg transfer device as recited in claim 8, wherein
said clamping means comprises a passive clamp fixedly mounted to said first rotator assembly, an active clamp movably mounted to said first rotator assembly for movement toward and away from said passive clamp, and pushing means for automatically moving said active clamp toward said passive clamp when said first rotator assembly is moved out of said first rest position and for automatically moving said active clamp away from said passive clamp when said first rotator assembly is moved into said first rest position.

10. An egg transfer device as recited in claim 9, further comprising
a striking plate fixed to said base unit; and
wherein said pushing means comprises at least one push rod slidably mounted to said first rotator assembly and having a first end fixed to said active clamp and a second end engageable with said striking plate, and a biasing means for biasing said at least one push rod toward said striking plate, such that when said first rotator assembly is moved into said first rest position, said second end of said at least one push rod engages with said striking plate to move said at least one push rod against the bias of said biasing means to thereby move said active clamp away from said passive clamp.

11. An egg transfer device as recited in claim 10, wherein
said active and passive clamp comprise elongated plates which extend substantially in parallel with said pivot shaft and, when said first rotator assembly is in said first rest position, said active and passive clamps protrude substantially vertically upwardly from said first rotator assembly.

12. An egg transfer device comprising:
a base unit having a horizontal upper support surface;
a horizontal pivot shaft supported on said base unit;
a first rotator assembly rotatably mounted to said pivot shaft for pivotal movement between a first rest position in which its contacts said base unit and a first transfer position, said first rotator assembly being adapted to receive an egg flat;
a second rotator assembly rotatably mounted to said pivot shaft, separately from said first rotator assembly, for pivotal movement between a second rest position in which it contacts said base unit and a second transfer position, said second rotator assembly being adapted to receive a hatcher tray; and
safety latch means for latching said first rotator assembly to said base unit when said first rotator assembly is in said first rest position to prevent pivoting of said first rotator assembly out of said first rest position, and for automatically unlatching said first rotator assembly from said base unit when the hatcher tray is mounted on said first rotator assembly.

13. An egg transfer device as recited in claim 12, wherein
said safety latch means comprises a safety latch bolt fixed to said base unit, a safety latch pivotably mounted to said first rotator assembly for movement between an engaging position in which it can engage with said safety latch bolt and a disengaging position in which it can disengage from said safety latch bolt, and a disengaging means for forcing said safety latch into said disengaging position when the hatcher tray is mounted on said first rotator assembly.

14. An egg transfer device as recited in claim 13, wherein
said safety latch includes an outwardly protruding contact arm; and
said disengaging means comprises a plunger slidably mounted to said first rotator assembly for movement between an upper position and a lowered position in which it presses against said contact arm to force said safety latch into said disengaging position, a plunger spring means for biasing said plunger toward said upper position, and a plunger head positioned such that when the hatcher tray is mounted on said first rotator assembly said plunger head will be pressed downwardly against by the hatcher tray.

15. An egg transfer device as recited in claim 12, further comprising
counterbalancing means for providing counterbalancing forces to counterbalance the weight of said first and second rotator assemblies and aid in the rotation of said first and second rotator assemblies between said first and second rest positions and said first and second transfer positions, respectively.

16. An egg transfer device as recited in claim 15, wherein
said first rotator assembly is pivotable to a first overcenter position, intermediate said first rest position and said first transfer position, in which the weight of said first rotator assembly does not tend to urge it toward either said first rest position or said first transfer position;
said second rotator assembly is pivotable to a second overcenter position, intermediate said second rest position and said second transfer position, in which the weight of said second rotator assembly does not tend to urge it toward either said second rest position or said second transfer position; and
said counterbalancing means is operable to provide variable counterbalancing forces effective to urge said first rotator assembly toward said first transfer position when said first rotator assembly is positioned on a side of said first overcenter position opposite said first transfer position, to urge said first rotator assembly toward said first rest position when said first rotator assembly is positioned on a side of said first overcenter position opposite said first rest position, to urge said second rotator assembly toward said second transfer position when said second rotator assembly is positioned on a side of said second overcenter position opposite said second transfer position, and to urge said second rotator assembly toward said second rest position when said second rotator assembly is positioned on a side of said second overcenter position opposite said second rest position.

17. An egg transfer device as recited in claim 12, further comprising
clamping means mounted to said first rotator assembly and responsive to movement thereof with respect to said base unit for automatically engaging the egg flat in said first rotator assembly when said first rotator assembly is moved from said first rest position toward said transfer position.

18. An egg transfer device as recited in claim 17, wherein
said clamping means comprises a passive clamp fixed mounted to said first rotator assembly, an active clamp movably mounted to said first rotator assembly for movement toward and away from said passive clamp, and pushing means for automatically moving said active clamp toward said passive clamp when said first rotator assembly is moved out of said first rest position and for automatically moving said active clamp away from said passive clamp when said first rotator assembly is moved into said first rest position.

19. An egg transfer device as recited in claim 18, further comprising
a striking plate fixed to said base unit; and
wherein said pushing means comprises at least one push rod slidably mounted to said first rotator assembly and having a first end fixed to said active clamp and a second end engageable with said striking plate, and a biasing means for biasing said at least one push rod toward said striking plate, such that when said first rotator assembly is moved into said first rest position, said second end of said at least one push rod engages with said striking plate to move said at least one push rod against the bias of said biasing means to thereby move said active clamp away from said passive clamp.

20. An egg transfer device as recited in claim 19, wherein
said active and passive clamps comprise elongated plates which extend substantially in parallel with said pivot shaft and, when said first rotator assembly is in said first rest position, said active and passive clamps protrude substantially vertically upward from said first rotator assembly.

21. An egg transfer device comprising:
a base unit having a horizontal upper support surface;
a horizontal pivot shaft supported on said base unit;
a first rotator assembly rotatably mounted to said pivot shaft for pivotal movement between a first rest position in which its contacts said base unit and a first transfer position, said first rotator assembly being adapted to receive an egg flat;
a second rotator assembly rotatably mounted to said pivot shaft, separately from said first rotator assembly, for pivotal movement between a second rest position in which it contacts said base unit and a second transfer position, said second rotator assembly being adapted to receive a hatcher tray;
counterbalancing means for providing counterbalancing forces to counterbalance the weight of said first and second rotator assemblies and aid in the rotation of said first and second rotator assemblies between said first and second rest positions and said first and second transfer positions, respectively;
wherein said first rotator assembly is pivotable to a first overcenter position, intermediate said first rest position and said first transfer position, in which the weight of said first rotator assembly does not tend to urge it toward either said first rest position or said first transfer position;

wherein said second rotator assembly is pivotable to a second overcenter position, intermediate said second rest position and said second transfer position, in which the weight of said second rotator assembly does not tend to urge it toward either said second rest position or said second transfer position; and wherein said counterbalancing means is operable to provide variable counterbalancing forces effective to urge said first rotator assembly toward said first transfer position when said first rotator assembly is positioned on a side of said first overcenter position opposite said first transfer position, to urge said first rotator assembly toward said first rest position when said first rotator assembly is positioned on a side of said first overcenter position opposite said first rest position, to urge said second rotator assembly toward said second transfer position when said second rotator assembly is positioned on a side of said second overcenter position opposite second transfer position, and to urge said second rotator assembly toward said second rest position when said second rotator assembly is positioned on a side of said second overcenter position opposite said second rest position.

22. An egg transfer device as recited in claim 21, wherein said counterbalancing means comprises at least one first counterbalance bracket fixed to and extending downwardly from said first rotator assembly;

at least one first tension spring connected between said at least one first counterbalancing bracket and at least one first predetermined location on said base unit;

at least one second counterbalance bracket fixed to and extending downwardly from said second rotator assembly; and at least one second tension spring connected between said at least one second counterbalance bracket and at least one second predetermined location on said base unit.

23. An egg transfer device as recited in claim 22, wherein at least one first cable is interposed between said at least one first tension spring and said at least one first counterbalance bracket;

at least one first pulley is mounted to an upper portion of said base unit beneath said rest position of said first rotator assembly, said at least one first cable being trained about said at least one first pulley;

at least one second cable is interposed between said at least one second tension spring and said at least one first counterbalance bracket; and at least one second pulley is mounted to a lower portion of said base unit beneath said rest position of said second rotator assembly, said at least one second cable being trained about said at least one second pulley.

24. An egg transfer device as recited in claim 22, wherein said at least one first counterbalance bracket is L-shaped and, when said first and second rotator assemblies are respectively in said first and second rest positions, extends downwardly from said first rotator assembly and horizontally beneath said second rotator assembly; and said at least one second counterbalance bracket is L-shaped and, when said first and second rotator assemblies are respectively in said first and second rest positions, extends downwardly from said second rotator assembly and horizontally beneath said first rotator assembly.

25. An egg transfer device as recited in claim 21, further comprising clamping means mounted to said first rotator assembly and responsive to movement thereof with respect to said base unit for automatically engaging the egg flat in said first rotator assembly when said first rotator assembly is moved from said first rest position toward said transfer position.

26. An egg transfer device as recited in claim 25, wherein said clamping means comprises a passive clamp fixedly mounted to said first rotator assembly, an active clamp movably mounted to said first rotator assembly for movement toward and away from said passive clamp, and pushing means for automatically moving said active clamp toward said passive clamp when said first rotator assembly is moved out of said first rest position and for automatically moving said active clamp away from said passive clamp when said first rotator assembly is moved into said first rest position.

27. An egg transfer device as recited in claim 26, further comprising a striking plate fixed to said base unit; and wherein said pushing means comprises at least one push rod slidably mounted to said first rotator assembly and having a first end fixed to said active clamp and a second end engageable with said striking plate, and a biasing means for biasing said at least one push rod toward said striking plate, such that when said first rotator assembly is moved into said first rest position, said second end of said at least one push rod engages with said striking plate to move said at least one push rod against the bias of said biasing means to thereby move said active clamp away from said passive clamp.

28. An egg transfer device as recited in claim 27, wherein said active and passive clamps comprise elongated plates which extend substantially in parallel with said pivot shaft and, when said first rotator assembly is in said first rest position, said active and passive clamps protrude substantially vertically upwardly from said first rotator assembly.

* * * * *